United States Patent
de Verteuil

(10) Patent No.: US 7,035,647 B2
(45) Date of Patent: Apr. 25, 2006

(54) EFFICIENT LOCATION DETERMINATION FOR MOBILE UNITS

(75) Inventor: Andre Laurent de Verteuil, Toronto (CA)

(73) Assignee: Openwave Systems Inc., Redwood City, CA (US)

( * ) Notice: Subject to any disclaimer, the term of this patent is extended or adjusted under 35 U.S.C. 154(b) by 565 days.

(21) Appl. No.: 10/071,116

(22) Filed: Feb. 7, 2002

(65) Prior Publication Data

US 2003/0148771 A1    Aug. 7, 2003

(51) Int. Cl.
*H04Q 7/20* (2006.01)

(52) U.S. Cl. .............................. 455/456.1; 455/456.2; 455/456.3; 455/452.4; 455/452.5; 455/456.6; 342/357.1; 342/357.14

(58) Field of Classification Search ................ 455/456, 455/457, 562, 25, 76, 33.4, 54.1, 404, 435, 455/432, 406, 456.1, 456.2, 456.3, 456.4, 455/456.5, 456.6; 342/463, 457, 464, 450, 342/451, 357.1, 357.14

See application file for complete search history.

(56) References Cited

U.S. PATENT DOCUMENTS

| | | | | |
|---|---|---|---|---|
| 5,208,756 A | | 5/1993 | Song ........................ 364/449 |
| 5,218,367 A | | 6/1993 | Sheffer et al. ............... 342/457 |
| 5,272,483 A | * | 12/1993 | Kato ....................... 342/357.14 |
| 5,519,760 A | * | 5/1996 | Borkowski et al. ........ 455/404.2 |
| 5,577,100 A | | 11/1996 | McGregor et al. ............ 379/58 |
| 5,600,706 A | * | 2/1997 | Dunn et al. ............... 455/456.2 |
| 5,721,678 A | | 2/1998 | Widl ....................... 364/424.04 |
| 5,724,660 A | * | 3/1998 | Kauser et al. ............. 455/456.2 |
| 5,758,288 A | * | 5/1998 | Dunn et al. ............... 455/456.5 |
| 5,767,788 A | | 6/1998 | Ness ....................... 340/825.49 |
| 5,774,802 A | | 6/1998 | Tell et al. ................... 455/408 |
| 5,774,829 A | * | 6/1998 | Cisneros et al. ............ 701/213 |
| 5,787,354 A | | 7/1998 | Gray et al. ................. 455/456 |
| 5,884,221 A | | 3/1999 | Wortham ................... 701/300 |
| 5,913,170 A | * | 6/1999 | Wortham ................... 455/457 |
| 5,926,133 A | * | 7/1999 | Green, Jr. .................. 342/363 |
| 6,195,556 B1 | * | 2/2001 | Reudink et al. ......... 455/456.2 |
| 6,212,392 B1 | * | 4/2001 | Fitch et al. .............. 455/456.2 |
| 6,246,884 B1 | * | 6/2001 | Karmi et al. ............... 455/521 |
| 6,256,504 B1 | | 7/2001 | Tell et al. ................... 455/456 |
| 6,324,404 B1 | * | 11/2001 | Dennison et al. ........ 455/456.1 |

(Continued)

FOREIGN PATENT DOCUMENTS

WO    WO 00/04730    1/2000

(Continued)

*Primary Examiner*—Temica Beamer
*Assistant Examiner*—Julio Perez
(74) *Attorney, Agent, or Firm*—Townsend and Townsend and Crew LLP

(57) ABSTRACT

The inventive system allows for more efficient use of resources for providing location information in a wireless network where multiple sources of such information may be available. In one implementation, a first source of location information such as Cell ID information is used to monitor the location of a mobile unit. The first source may provide sufficient location information in many instances. For example, in the case of a location-based billing application, Cell ID information may be sufficient in some cases to indicate that a subscriber is within or outside of a home zone. In other cases, more accurate information may be required to make such a determination. When required, a more accurate source of information such as TDOA or GPS information may be invoked. The invention allows for more efficient use of the multiple sources by allowing for reduction of the instances where a high resource location information source is accessed.

32 Claims, 5 Drawing Sheets

U.S. PATENT DOCUMENTS

| | | | |
|---|---|---|---|
| 6,859,173 B1* | 2/2005 | Spilker et al. | 342/464 |
| 2002/0090957 A1* | 7/2002 | Harris | 455/456 |
| 2002/0123354 A1* | 9/2002 | Nowak | 455/456 |
| 2003/0148774 A1* | 8/2003 | Naghian et al. | 455/456 |
| 2003/0157939 A1* | 8/2003 | Wang et al. | 455/446 |

FOREIGN PATENT DOCUMENTS

| | | |
|---|---|---|
| WO | WO 00/27143 | 5/2000 |
| WO | WO 01/26393 A1 | 4/2001 |
| WO | WO 01/33825 A1 | 5/2001 |
| WO | WO 01/35683 A1 | 5/2001 |

* cited by examiner

EFFICIENT LOCATION DETERMINATION FOR MOBILE UNITS

FIELD OF THE INVENTION

The present invention relates in general to providing location information regarding mobile units in a telecommunications network and, in particular, to the efficient use of resources for locating mobile units in a network where multiple sources of location information are available.

BACKGROUND OF THE INVENTION

A number of different types of location-based service applications have been developed or proposed for wireless telecommunications networks, i.e., communications networks involving at least one wireless interface between communicating devices. Generally, such applications determine or otherwise obtain location information regarding the location of a mobile unit under consideration, e.g., a wireless telephone, PDA, wireless data terminal or the like, and provide service information based on the mobile unit location. Examples of location-based service applications include E911, local service information and location-based billing applications. In E911 applications, emergency calls are routed to a selected dispatcher based on the location of origin of an emergency call. Additionally, location information may be transmitted to the dispatcher or another location to assist in the emergency response. Location-based service applications provide information regarding local services such as hotels or restaurants based on a request entered via a mobile unit. In location-based billing applications, a rate for a call placed or received by a wireless telephone is dependent on the location of the phone, e.g., whether the phone is inside or outside of a "home zone" for the subscriber proximate to the subscriber's residence, business or other defined location. Various other applications have been proposed or implemented.

Location-based service applications generally involve comparing a current (or recent) location to a location of interest, e.g., a point identified by geographical coordinates, a boundary, or a predefined service zone definition, to make a binary determination (e.g., that the mobile unit is either inside or outside of a zone under consideration), a matching determination (e.g., that the mobile unit location matches or overlaps one or more stored zone definitions) or a proximity determination (e.g., to identify the closest service provider(s)). In any case, at one or more relevant processing steps, mobile unit location information corresponding to a particular time is compared to service location information corresponding to one or more service zones, service provider locations or other stored location information. Thus, in E911 applications the mobile unit location at the time of placing an E911 call may be compared to the dispatcher coverage zones of an emergency response network. In local service information applications, the location of a mobile unit at the time of submitting, for example, a local hotel information request, may be compared to a database of hotel location information. The location of a mobile unit during a call may be used by a location-based billing application to establish billing parameters for the call.

In addition, location-based service applications generally provide service information in response to an input by a subscriber or other application user invoking the application. In the case of local service information applications, the input is generally an explicit service request entered via the mobile unit. In E911 or location-based billing applications, the location-based service application may be invoked invisibly, from the perspective of the mobile unit, upon making a call. In other cases, the input invoking the application to provide service information based on the location of the mobile unit is received from a separate application. In such applications, the service information is nonetheless provided in response to an input requesting location-based services. That is, the trigger event generally is, from the perspective of the service application, a service request.

In some cases today, multiple sources of location information are available. For example, within certain areas of existing networks, a network-based Location Determination Technology (LDT), e.g., Position Determination Equipment (PDE) or a Serving Mobile Location Center (SMLC), is available to locate mobile units. Such network-based equipment often utilize a multilateration technology, such as time difference of arrival (TDOA including E-OTD and OTDOA) or angle of arrival (AOA) to locate a unit based on signals transmitted between the mobile unit and multiple equipment sites having known locations. Some mobile units are equipped with Global Positioning System (GPS) receivers that can determine the position of the unit based on signals from satellites of the GPS constellation. In addition, location information may be available from the network itself, e.g., information that is used to route calls, manage cell-to-cell handoff or otherwise operate the network. For example, such information may include a cell, cell sector or other network subdivision identifier ("Cell ID") or handoff information residing in the network for the purposes of handoff management such as Network Measurement Report (NMR) and Mobile Assisted Hand-Off (MAHO) information. Thus, the available sources of location information may include LDT sources such as network-based LDTs and GPS and internal network information such as Cell ID and handoff information.

SUMMARY OF THE INVENTION

The present invention is directed to allowing for more efficient use of resources for providing location information where multiple sources of such information may be available. Heretofore, many location-based service applications have been developed as part of integrated systems involving specific location determination equipment and a dedicated interface between such equipment and the application supported by the equipment. Accordingly, the developers of these systems have generally not addressed issues relating to arbitrating between multiple location sources, nor have these developers recognized any opportunities for optimizing the use of multiple available resources.

More recently, some developers such as SignalSoft Corporation of Boulder, Colo., have begun developing systems that can utilize different location sources, alone or in combination. Such systems may be implemented in connection with a gateway between multiple sources of location information and one or more location-based service applications. Alternatively, such functionality may be implemented in connection with an SMLC, PDE, by particular applications or in connection with other network elements. While many service providers have recognized advantages of such systems, such attention has generally focused on simplification of application development, shortened development cycles/improved time to market, improved ability to service a greater number of subscribers independent of handset capabilities, increased geographic coverage areas for location-based service applications, reduced compatibility concerns relating to varying network and infrastructure environments, and potentially increased accuracy of location determination.

The present invention is based in part on the recognition that the ability to access multiple sources of location information also enables intelligent usage of certain sources in concert for enhanced efficiency. This may be achieved in connection with a location gateway system or in any other multiple source environment.

Invoking different location sources often entails consumption of different resources. Such resources may be system resources, e.g., processing resources, messaging traffic, bandwidth or other finite system resources, or may involve pecuniary resources, e.g., in the event that a location source system provides charges for access to location information based on usage. With regard to system resources, it will be appreciated that different sources have different requirements. For example, invoking a network-based PDE may require substantial messaging involving multiple equipment sites coupled with substantial processing. Invoking a GPS or network-assisted GPS system may also require significant messaging and processing as well as use of limited air interface bandwidth. By contrast, accessing internal network information may entail minimal additional burden to network resources, as such information may already reside in the network and be available at a gateway or other relevant service platform.

Similarly, different location sources may involve different lag times between invoking a source or otherwise initiating access and obtaining the desired information. For example, obtaining location information from a network (non-handset) based multilateration PDE may involve transmitting an invoke request to an associated controller, accessing network registers to route a signal to the mobile unit, transmitting a force access signal to the mobile unit, receiving signals from the unit at multiple equipment sites, receiving inputs from the multiple sites and verifying that sufficient information has been received, processing the inputs to determine the mobile unit location and reporting the information to the requesting platform. Each step in this process may contribute to the resulting lag time. By contrast, for example, Cell ID information may be available substantially immediately at the platform or may be quickly obtained from a Home Location Register (HLR) or via other network elements (e.g., an MSC or SCP). messages.

The present invention further involves a recognition that, for many applications of interest, it may be desirable to sequentially use one source of location information and then another, based, for example, on the expected resource requirements or time lags associated with those sources. For example, in the case of a binary zone matching application such as location-based billing, a low resource/fast response time source, such as a network source that provides Cell ID information, may first be accessed to obtain low accuracy location information. Although such information may have a lower accuracy, such accuracy may still be sufficient to determine, for example, that a subscriber is well outside his home zone. The need to access a higher resource and/or slower response time source can thus be avoided until the Cell ID information indicates that higher accuracy information is required, e.g., because the coverage area of the identified cell overlaps the home zone.

In other cases, a higher accuracy or slower response time source may be accessed first. For example, because of a favorable business relationship with a given location provider, it may be advantageous to use a relatively accurate source, such as a TDOA source, for periodic monitoring of mobile unit location. However, when a location relationship of interest is indicated, a different source may be accessed, e.g., because the service application specifies that source or because information from that source can be most easily handled by a gateway or the service application.

The location information from the first source may also be used to determine not only if, but when the second source is invoked. Thus, in the example above regarding a location-based billing application, Cell ID information is used to determine whether more accurate information is necessary, e.g., in connection with a call placed to or from a subscriber. In a number of applications, including alternative implementations of location-based billing and applications for monitoring the movements of children, automobiles or other assets, it may be desired to provide notice when a boundary of interest is crossed. In such cases, a first source may be used for monitoring on a periodic or other repeating basis and a second source invoked when necessary, e.g., as a boundary is approached. It will be appreciated that the associated trigger event may be proximity-based or based on some other location relationship rather than boundary crossings. In any event, it will be appreciated that the present invention allows for intelligent use of multiple sources, including for enhanced efficiency.

Thus, in accordance with one aspect of the invention, a method is provided for use in providing location information regarding mobile units in a telecommunications network. The method includes the steps of: receiving a location request including identification information for a mobile unit and parameter information regarding desired location information; obtaining first location information from a first source; comparing the first location information to the parameter information of the location request; based on the comparison, selectively obtaining second location information from a second source; and providing an output related to the location request. Each of the sources has an expected lag time and expected resource requirement, and at least one of these lag times or resource requirements varies as between the two sources. In many contemplated implementations, the first source will have a lower resource requirement and a shorter lag time and this source will be used for ongoing monitoring purposes. The output may be based on either one or both of the first location information and the second location information. For many implementations, the information from the second source will be used to provide the output.

The output may be provided to the requesting application, to another application (e.g., a billing application), to the mobile unit or to any other network node (e.g., to a computer monitoring the movements of a mobile unit or fleet of mobile units). The location request may be a specific request, i.e., a one-time only request, such as a request to determine whether an identified mobile unit is currently inside or outside of a home zone. On the other hand, the location request may be a general request, i.e., an ongoing monitoring request, such as a request to be notified whenever an identified mobile unit crosses a specified boundary or attains another location relationship of interest. In other applications, such as applications that notify all local subscribers of emergency road or weather conditions or provide advertising or other business information to subscribers in a defined area, the location request may identify many subscribers or identify subscribers by type (e.g., all subscribers who have registered for or otherwise agreed to receive certain types of information).

In accordance with another aspect of the present invention, a first source is used for ongoing monitoring and a second source is used to provide an output. The method includes the steps of: receiving a location request; monitoring information from the first source over time to obtain successive instances of first location information regarding an identified mobile unit; performing a comparison to determine whether a location of the mobile unit as indicated by the monitored information satisfies a defined relationship relative to stored location information; based on the comparison, selectively obtaining second location information from a second source; and providing an output related to the location request based on the second location information. In one implementation, this method is used in connection with a zone-based service application such as location-based billing or a boundary crossing application. Typically, a low resource source such as a Cell ID source is used to monitor the location of identified mobile units on a periodic or other repeating basis. When a relationship of interest such as a boundary crossing or traversal of a home zone definition is indicated, a second, typically more accurate, source is invoked. Thus, the position of the mobile unit relative to an area of interest can be monitored on an ongoing basis using a low resource source and a premium source can be reserved for use as necessary.

An apparatus constructed in accordance with the present invention preferably includes: a first interface structure for receiving a location request and providing output to specified locations; a second interface structure for obtaining location information from first and second sources; and a processor operative for using the first interface to obtain location requests, using the second interface to obtain first location information, performing a comparison of the first location information to parameter information of the location request and, based on a comparison, using the second interface to obtain the second location information. The processor is further operative for using the second interface to provide an output related to the location request based on at least one of the first location information and second location information. The first interface structure may comprise a processor or processing module configured to define a standardized interface for requesting and providing location information, e.g., to and from a location gateway. The second interface structure may include a port for receiving first location information, e.g., from an MSC, SCP, HLR or other telecommunications structure and/or ports for receiving location information directly from position determination equipment sites or associated controllers. The processor may be any suitable platform associated with or otherwise linked to appropriate structure of the telecommunications network such as an MSC, SCP, or HLR.

BRIEF DESCRIPTION OF THE DRAWINGS

For a more complete understanding of the present invention and further advantages thereof, reference is now made to the following Detailed Description, taken in conjunction with the drawings, in which.

DETAILED DESCRIPTION OF THE INVENTION

The present invention is directed to a system for intelligent selection of sources for location information in connection with a telecommunications network where there is access to multiple sources of such information. The invention is applicable to a variety of location-based service applications in a variety of network environments involving a variety of different location sources.

In the following description, the invention is set forth in the context of particular implementations involving a first source for providing cell ID information and a second source for providing multilateration location information. The cell ID information is generally used first to reduce the number of instances where the multilateration source is invoked. This has particular advantages for a number of applications as discussed below in that it promotes efficient use of network location resources. It will be readily appreciated, however, that other types of location sources and/or other sequences for accessing multiple location sources may advantageously be utilized in accordance with the present invention. Accordingly, the following description should be understood as exemplifying the invention and not by way of limitation.

Figure 1:
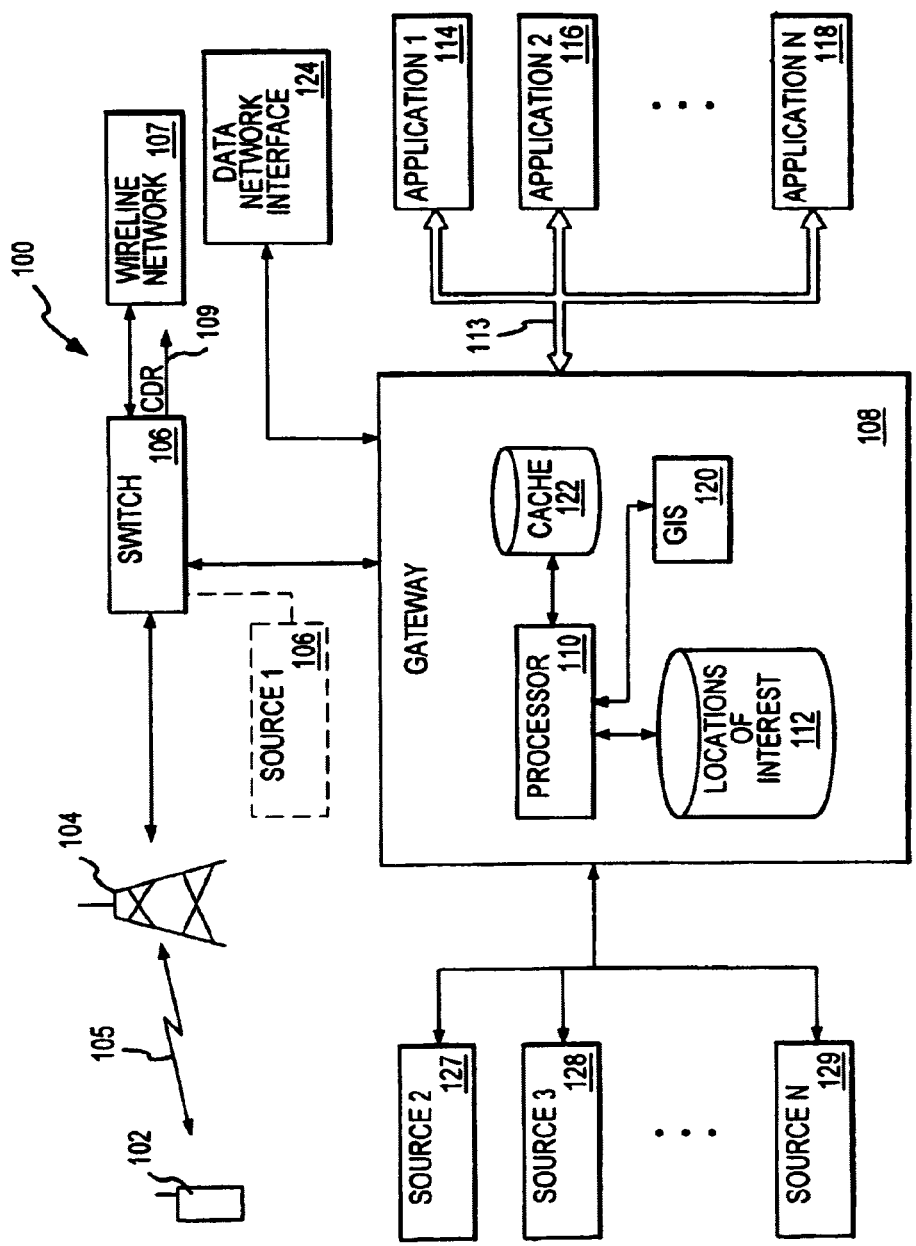
FIG. 1 is a schematic diagram of a telecommunications network implementing the present invention.

FIG. 1 illustrates a wireless network 100 implementing the present invention. In the network 100, a mobile unit 102 communicates with cell site equipment 104 via an RF interface 105. In the illustrated example, the mobile unit 102 is shown as being a wireless telephone. It will be appreciated, however, that any suitable mobile unit can be utilized including, for example, personal digital assistants, data terminals having a wireless modem, etc. The cell site equipment 104 may be, for example, a cell sector antenna or the like. In the illustrated network 100, the cell site equipment 104 is interconnected to a switch 106. Although only one piece of cell site equipment 104 is illustrated, it will be appreciated that switch 106 may service multiple cells. The switch 106 may include, for example, a mobile switching center (MSC), Service Control Point (SCP) or any other structure for routing communications between a calling unit and a called unit. Among other things, the switch 106 is operative for routing calls between the wireless network 100 and a wireline network 107 for communications between the mobile unit 102 and another mobile unit, a wireline unit or a data network node. As will be discussed in more detail below, the switch 106 may also be operative for generating billing records such as Call Detail Records(CDRs) 109 for transmission to a billing application of a wireless carrier or other service provider.

FIG. 1 also shows a gateway 108, illustrated in connection with the switch 106. It will be appreciated that such a gateway may be associated with one or more (typically numerous) switches. Moreover, different gateways may service different subscribers, carriers, applications, equipment, network areas, etc. The gateway 108 may be, for example, a computer platform for executing a variety wireless network applications. The gateway 108 may be physically located proximate to the switch 106 or may be remotely located and interconnected to the switch 106 by a local area network, wide area network or other communications pathway. The illustrated gateway 108 includes a processor 110 for running a source selection and location provisioning application in accordance with the present invention. As will be understood from the description below, a source selection application in accordance with the present invention may be incorporated into location-based services application or may be implemented in connection with a separate gateway (as shown) or other separate functional unit.

In order to implement intelligent source selection, the application running on processor 110 compares location information to mobile unit location information. Such location information may be stored at the gateway platform, specified by the requesting application or otherwise made available to the processor 110. In the illustrated embodiment, it is stored in the gateway platform. The stored location information 112 stores definitions of locations of interest for use by the location-based service applications 114, 116 and 118. The definitions of these locations of interest may be provided in any suitable form. For example, a service zone for a location-based billing application, asset tracking application or the like may be defined as a set of cell identifiers or cell sector identifiers that represent the service zone. Alternatively, the service zone information may be stored as a set of geographical coordinates or geographical boundaries that define the service zone. For cell sector implementations, such geographical information may be converted into current network topology, e.g., cell sector identifiers, at the time of a location comparison. It will be appreciated that other conventions may be utilized for storing a representation of a service zone area.

In addition, it will be appreciated that a GIS system 120 may be utilized for inputting and formatting the service zone information. For example, a service provider or other person defining a service zone may wish to input service zone boundaries relative to an address, streets or other topological information. A GIS application, such as the MAPS application marketed by SIGNALSOFT Corporation of Boulder, Colorado, may be utilized to receive such inputs and convert the associated service zone definitions into geographical information formatted for convenient handling by the boundary crossing application. Thus, service zone definitions may be converted from one topological system, e.g., addresses or street boundaries, to another topological system, e.g., geographical coordinates or cell/cell sector identifiers. In any case, the definition of the location of interest as well as the location of a mobile unit may be expressed in terms of a quadtree data structure as described in U.S. Pat. No. 6,212,392, entitled "Method for Determining if the Location of a Wireless Communication Device is Within a Specified Area," which is incorporated herein by reference.

Location information regarding the locations of mobile units may also be stored for use by the source selection application. Depending, for example, on the nature of the location finding technology employed, the nature of the received location information and the route by which the information is obtained may vary. For example, in the case of cell sector location information, a cell sector identifier may be extracted from communications between the mobile unit 102 and the switch 106. In the case of handset-based location finding equipment such as GPS information, location coordinates may be encoded into communications transmitted from the unit 102 to the cell site equipment 104. In other cases, raw location information may be preprocessed by a location management program running on the gateway 108 or another platform.

In the illustrated embodiment, the gateway 108 is illustrated as including a location of interest database 112 and a location cache 122. Such a database 112 may include service zone definitions or other locations of interest for one or more of the location-based service applications 114, 116 and 118.

The location cache 122 may include location information for mobile units at various times indexed, for example, to a mobile unit identifier such as a MIN/ESN. Although the database 112 and cache 120 are thus illustrated as distinct elements, it will be appreciated that the database 112 and cache 120 may utilize shared or non-dedicated memory resources. Moreover, the database 112 and cache 120 need not be located on the gateway 108 or on the same machine as one another, but rather, may reside at any location where the stored information can be accessed by the source selection and location provisioning application.

As noted above, depending on the specific application and other factors, the resulting service information can be transmitted to different recipients via different pathways. For example, in the case of an asset tracking application, the resulting service information may be provided to a data terminal at a monitoring station remote from the monitored mobile unit. To support such applications, service information can be transmitted from the illustrated gateway 108 to a data network interface 124 for transmission across a data network such as the Internet. In other applications, such as re-rating for location-based billing applications, the recipient of the service information is another application such as a billing application that is registered with the gateway 108 to receive service information, e.g., related to mobile unit location at call time. In the case of the location-based billing application, the service information may be a billing value in a Call Detail Record (CDR) 126. In such a case, the service information may be transmitted to the associated application by way of the switch 106. In other cases, such as applications that provide information about local services (e.g., hotel locations), it is desirable to transmit the service information to the monitored mobile unit 102. In such cases, the service information may be transmitted to the unit 102 via the switch 106 and cell site equipment 104.

The location-based service applications 114, 116 and 118 may run on the gateway 108 or on another platform. In any case, communications between the source selection and location provisioning application and the service applications 114, 116 and 118 may be handled via interface 113. This interface preferably provides a standardized form, message sets and data fields for transmitting/receiving location requests and receiving/transmitting location information as described in U.S. Pat. No. 6,321,092 entitled "Multiple Input Data Management for Wireless Location-Based Applications," which is incorporated herein by reference. Such an interface advantageously allows applications 114, 116 and 118 to operate without compatibility concerns regarding network environment and the nature of the location sources 127–129.

The service information may be presented in various forms. For example, service information may be transmitted to the mobile unit 102 via a short messaging system via a data channel or via an audio channel for providing an audio message that can be played on the unit 102. In this regard, a text message may be displayed on a LCD display or other display of the mobile unit 102. As previous noted, an output may be provided to an application 122 such as a billing application by populating a field of the CDR. In other applications, an audio, text and/or full graphics presentation (e.g., a graphical map showing mobile unit location) may be provided at a data network interface 124. It will thus be appreciated that the source selection and location provisioning application may utilize appropriate hardware, firmware and/or software for providing the service information in the appropriate format and in accordance with appropriate protocols. Thus, the information may be packetized for transmission across the Internet in accordance with IP protocols. Data may also be transmitted to the mobile unit 102 utilizing proxies, a microbrowser and other elements for executing a wireless data communications protocol. Similarly, in the case of a CDR output, the CDR may be populated in accordance with telecommunications network protocols.

The gateway 108 can support multiple location-based services applications, as generally indicated by applications 114, 116 and 118. The present invention supports a number of applications where service information (e.g., routing information, call rating information, local service information, etc.) is provided in response to comparing mobile unit location to stored location information, e.g., a home zone or other service zone or a boundary. A number of examples of such applications are described below. It will be appreciated that many more examples are possible. Nonetheless, the following examples illustrate that such applications can vary, for example, with respect to the types of service information that are generated as well as how and to whom or what the service is reported.

One type of application where it may be desired to monitor boundary crossings relates to fleet management such as rental vehicle tracking. Rental vehicles may be tracked to insure that the tracked rental vehicle is being used in accordance with the rental contract, e.g., that the vehicle is not being taken across certain national borders. Boundary crossings may be proscribed due to insurance limitations, political/social considerations or other reasons. The rental company may therefore desire to receive notification when boundary crossings occur. It will be appreciated that the rental company would not necessarily require continual updates of vehicle locations (though some companies may choose to obtain such updates) but, most importantly for present purposes, will desire notification triggered by a boundary crossing event.

Such notification can be conveniently provided via a data network such as the Internet. In this manner, an official of the rental company may receive a graphical or text notification identifying the monitored vehicle and the boundary crossing event, e.g., "ID #nnn has crossed into/out of the United States." In response to such notification, the rental company may contact the lessee (e.g., by car phone) remotely disable the rental vehicle, assess a contractual penalty or take other remedial measures.

As will be discussed in more detail below, such a boundary crossing event can be identified using a conventional wireless telephone or other mobile unit carried by the rental vehicle and, preferably, configured to remain powered on when the vehicle is in use. Such a monitoring application can take advantage of existing wireless network gateways and location finding equipment to provide monitoring with minimal, if any, equipment on board the rental vehicle dedicated to position monitoring, thereby reducing costs and facilitating rapid deployment. As described below, a wireless network gateway remotely or locally associated with a network switch can be connected to one or more location finding equipment systems for receiving location information regarding the monitored vehicle or its on-board mobile unit and can be further connected to a data network for providing reports to the rental company's data terminal.

Another type of application where it may be desired to monitor mobile unit location on a one time or repeated basis is call management applications including call routing applications like E911 (which may further involve forwarding location information to a Public Service Answering Point—PSAP) location-based billing applications. For example, in location-based billing applications, the rate applied for calls placed or received using a wireless telephone depends on the location of the phone. In this regard, wireless carriers may wish to encourage subscribers to more fully use their wireless phones by providing call rating competitive with land line phones for calls placed in or near the subscriber's home, office or other defined location, but providing a different rating for calls placed or received outside such "home zones." The relevant rating information may be provided to a billing system of the carrier or other service provider by populating an associated field of a Call Detail Record (CDR) with a billing value. In the case of E911 applications, the mobile unit location may be compared to PSAP coverage areas for the purpose of call routing.

In connection with such applications, it may be desired to check mobile unit location at call time and/or monitor boundary crossings independent of call status for a number of reasons. For example, in the case of location-based billing, a location request may be transmitted at call initiation or some other time to determine a rate for the call. Alternatively, crossings into or out of a home zone may be used to re-rate an ongoing call or otherwise re-set a billing parameter. Also, it may be useful to provide an indication to the subscriber regarding location relative to a home zone, e.g., via a display element on the handset, so that the subscriber can know in advance of a call what rates may apply. Thus, boundary crossings may be monitored in order to transmit messages to the mobile unit causing the display element to toggle between "home zone" and "outside home zone" displays. In the case of call re-rating, a single call may be divided into parts billed at different rates, e.g., by generating multiple CDRs, or a single rate may be selected based on a boundary crossing. In either case, the service information provided by the application may simply be a rating value and the recipient may be a billing application.

A final example of applications that may make use of boundary crossing or other location information is a local service or friend notification application. Such an application may provide emergency information—e.g., regarding local traffic, weather, or other emergency conditions—or other service information—e.g., information about local hotels, restaurants or other services—to all or subscribing system users upon entry into a service area. For example, in the case of severe weather warnings, a traveler may be notified by phone or display upon entering the affected area (such as on crossing a county line). For a traffic jam, warnings and alternative route or other information may be provided to commuters coming within a certain area encompassing the problem location. Similarly, local service providers may transmit pricing, event or other service information to willing, approaching travelers. In the case of "friend" notification, a subscribing system user and/or an identified "friend" may be notified when the user comes within a certain proximity of the mobile unit of the friend or the friend comes within a certain proximity of the user. In such cases, the "boundary" may be defined and redefined "on the fly".

In such cases, service information may be transmitted to the monitored mobile unit, an associated data terminal or other device proximate to the monitored unit. The information may be provided in audio, text, graphical or other form depending, for example, on the limitations of the user equipment and the type of information required. Transmission of the service information may be triggered by crossing a political or government boundary, crossing within a radius of a location of interest or otherwise crossing a service zone boundary of any shape.

As the foregoing examples illustrate, the type of service information, form of service information transmission, intended recipient and other details can vary from application to application or even within a particular application in accordance with the present invention. The illustrated applications 114, 116 and 118 may be any of various types of location-based service applications and substantially any number of applications may be supported by the gateway 108 in accordance with the present invention.

As shown in FIG. 1, multiple sources 126–129 may be associated with the network 100. As shown, these sources may be connected to the gateway via the switch or independent of the switch. These sources may employ any of a variety of location finding technologies including AOA, TDOA such as GPS and cell/sector technologies. It will be appreciated that the nature of the data obtained from the sources 126–129 as well as the path by which the data is transmitted varies depending on the type of source and the ability to accommodate a variety of sources is an important aspect of the present invention. Some types of sources include equipment in the handset. Examples include certain GPS and other TDOA systems. In such cases, location information may be encoded into signals transmitted from the handset to a cell site or other receiver, and the information may then be transferred to the gateway 108 via the switch 106 or otherwise. Other sources, e.g., network-based systems, use equipment associated with individual cell sites such as specialized antennae to make location determinations such as by triangulation and, again, the resulting location information may be transferred to the gateway 108 via the switch 106 or otherwise. Still other sources employ a network of dedicated source equipment that is overlaid relative to the wireless network 100. Such systems may communicate location information to the gateway 108 independent of the switch 106 and network cell site equipment. In addition, some source technologies can be implemented via equipment resident in the handset, in cell sites or other network locations and/or in dedicated sites such that the data pathway of the location information may vary even for a given source technology.

Although a number of the illustrated sources 126–129 are shown as operating separate from the switch 100, in reality, certain ones of the sources, such as a cell ID source, would likely provide information via the switch 106. The sources may further include network-based AOA systems and network-based TDOA systems and external systems such as GPS. Generally, the illustrated network based systems such as AOA and network TDOA systems determine the location of a wireless station 102 based on communications between the wireless station and the cell site equipment of multiple cell sites. For example, such systems may receive information concerning a directional bearing of the wireless station 102 or a distance of the wireless station 102 relative to each of multiple cell sites. Based on such information, the location of the wireless station 102 can be determined by triangulation or similar geometric/mathematic techniques. External systems such as GPS systems, determine the wireless station location relative to an external system. In the case of GPS systems, the wireless station 102 is typically provided with a GPS receiver for determining geographic position relative to the GPS satellite constellation or forwarding satellite based information to a network element that computes location. Thus, various types of location information may be transmitted across an air interface to the network 100. Additionally, in the case of network assisted GPS or A-GPS, certain GPS information may be combined with network information to compute the location of a mobile unit.

As shown, the gateway 108 receives location information from the various sources 126–129. The nature of such information and handling of such information is described in more detail below. Generally, however, such information is processed by the source selection and location provisioning application to provide location outputs for use by any of various service applications 114, 116 and 118 in response to location requests from the application.

Figure 2:
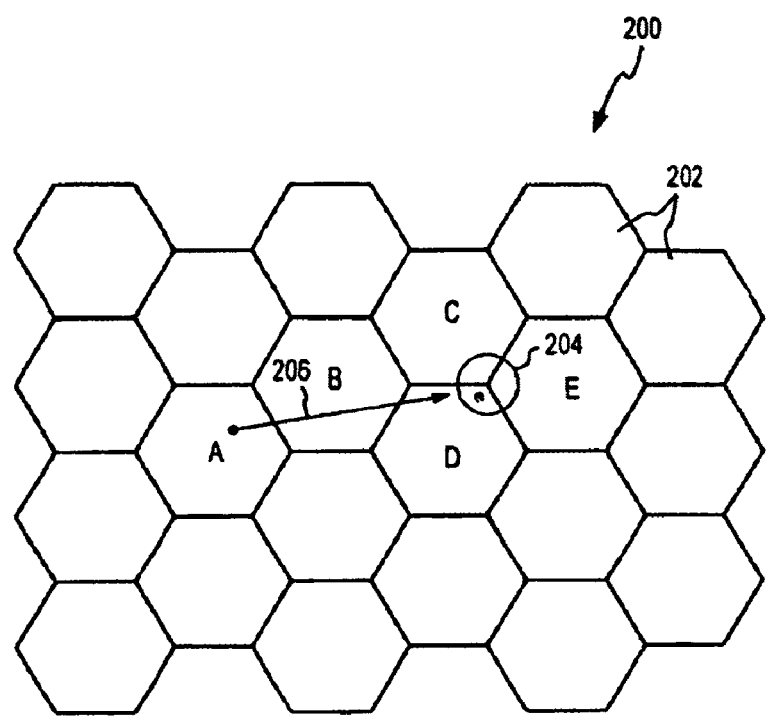
FIG. 2 is a schematic diagram showing a portion of the topology of a wireless network, a home zone and a moving mobile unit to illustrate one application of the present invention.
Figure 3:
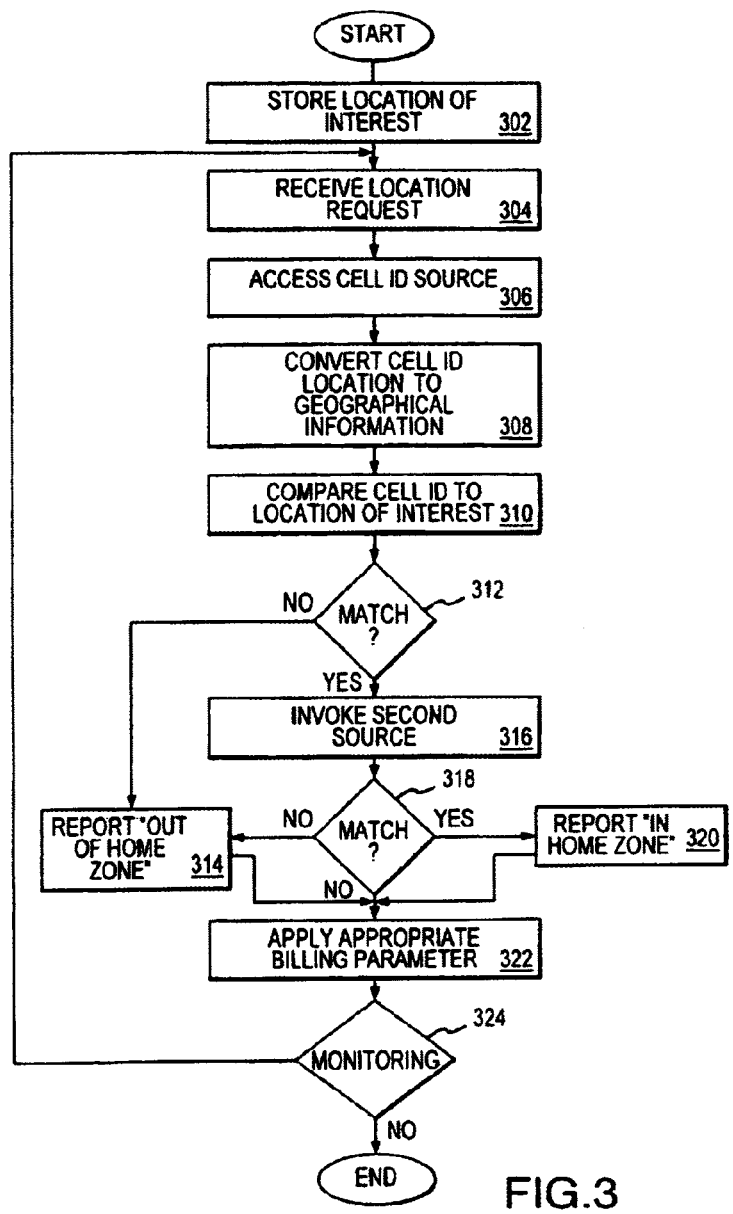
FIG. 3 is a flow chart illustrating a process in accordance with the present invention.
Figure 4:
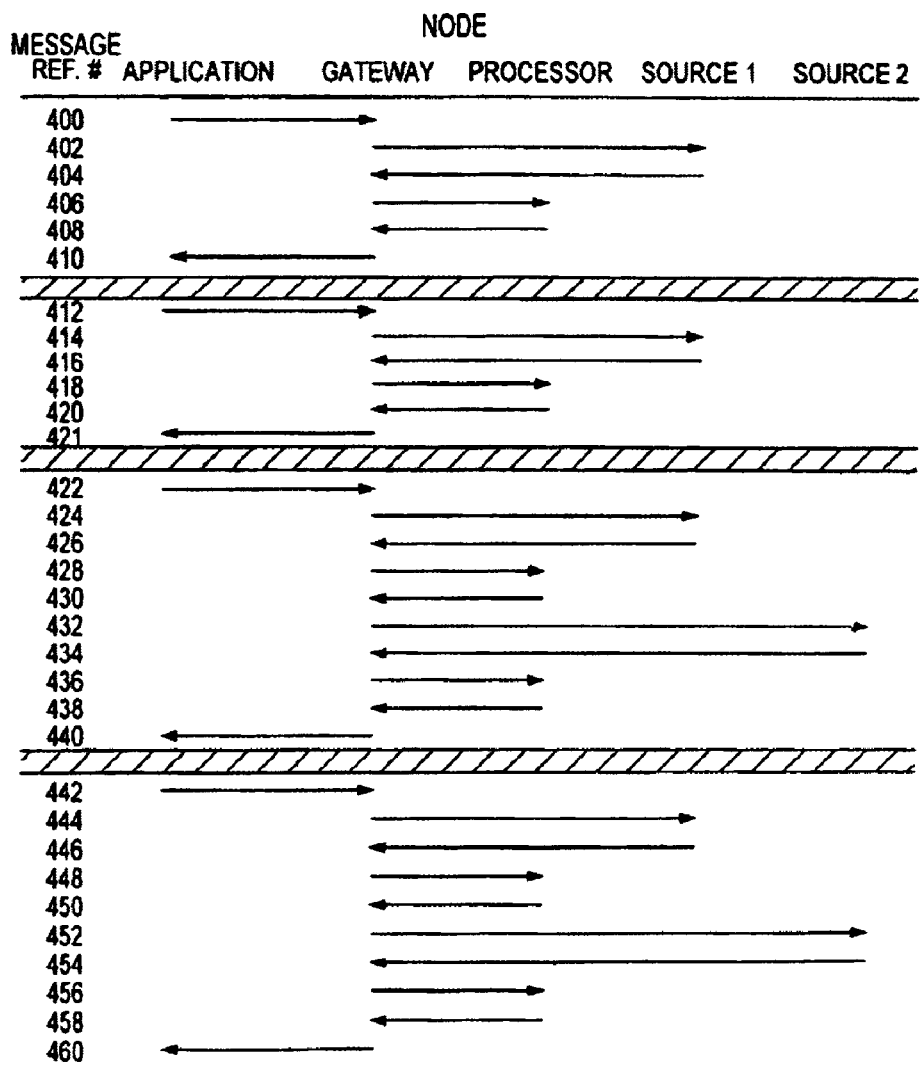
FIG. 4 is a messaging sequence diagram illustrating another implementation of the present invention.

FIGS. 2–4 illustrate the present invention in the context where the service application is a location-based billing application. Referring first to FIG. 2, a portion of a wireless network is generally indicated by the reference numeral 200. As shown, the network 200 is divided into a number of cells 202. For purposes of illustration, the cells are illustrated as being regular in terms of size and shape. In reality, the various cells of a wireless network may vary in size and shape due to terrain and other factors. Moreover, the coverage areas of the cells may overlap to a significant extent such that a mobile unit located at a particular location may communicate via any one of two or more adjacent cell site antennas. Finally, although FIG. 2 illustrates undivided cell areas, a given cell may be divided into sectors, e.g., three approximately 120° areas relative to a center point of a cell. In this regard, cell sector information may be available to better determine the approximate location of a mobile unit. Thus, although FIG. 2 illustrates a simplified topology of a wireless network, it should be appreciated that various types of network typology information may be utilized to locate a mobile unit in accordance with the present invention.

In the illustrated network 200, a subscriber's home zone 204 is defined as a circular area surrounding a home zone location, e.g., geographical coordinates defining the subscriber's residence, work location or other specified location. It will be appreciated that the home zone 204 may be of any shape and need not be centered relative to a residence or the like. As shown, the home zone 204 overlaps three adjacent cells designated cells C, D and E. In a typical location-based billing application, the subscriber will be charged a first rate, such as a rate competitive with land line rates, for calls within the home zone 204, and a second rate, such as the normal rate for wireless network usage under the subscriber's plan for calls outside of the zone 204.

Ray 206 illustrates the travel path of a moving mobile unit. As shown, the unit travels from cell A through cell B and cell D towards home zone 204. In the examples below, the user is assumed to place a succession of calls during travel along this pathway 206 and the system of the present invention is utilized to efficiently obtain location information from a cell ID source and a multilateration source such as a TDOA or GPS source.

This process is illustrated in the flow chart of FIG. 3. The process 300 is initiated by storing (302) a location of interest. This could be stored, for example, at a gateway platform, application platform or other network element. The nature of this location information can vary depending, for example, on the type of location-based service application and the specific implementation. For example, in the case of the illustrated location-based billing application, the home zone information may be defined relative to a particular subscriber's residence or based on predefined service zones. In the former case, the home zone may be defined as a circle of predefined radius centered at the subscriber's residence location. In the latter case, home zones may be defined by zip codes, street boundaries or other predefined zones. For other applications, the location information need not define an enclosed area but may involve a single boundary or any other type of appropriate location information. As noted above, the home zone may be defined by reference to a quadtree data structure.

After the location of interest has been stored, a gateway, service application or other system in accordance with the present invention may receive (304) a location request. In the case of a gateway associated with a location-based billing application, the location request may be received from the service application upon receiving an indication that a subscriber has placed or received a call. Alternatively, such an application may request ongoing monitoring of subscriber location, for example, to continually provide an indication to a subscriber regarding zone status. Thus, the location request may be a one time only request or an ongoing update request.

In the illustrated implementation of the present invention, cell ID information is used for monitoring so that instances of invoking a relatively high resource position determination system such as a multilateration source can be minimized for enhanced efficiency. Accordingly, the illustrated process 300 initially proceeds by accessing (306) a cell ID source. It will be appreciated that cell ID information is encoded into standard telecommunications network messages for the purposes of call routing. Accordingly, such information is readily available, for example, from an HLR or switch. Moreover, if the location gateway is implemented in connection with a platform for managing other network functions related to network management, such information may be immediately available on the platform where the gateway is implemented. In any case, such cell ID information can generally be obtained with minimal use of resources and minimal response time as such information generally resides within the network.

In a preferred implementation of the present invention, the cell ID location is next converted (308) into geographic coordinates, e.g., a circular area circumscribing the geographic coverage area of the corresponding cell. Such translation facilitates efficient location comparisons. Thus, for example, both the home zone definition and the cell location definitions may be expressed in terms of geographical coordinates and then mapped to a quadtree data structure representing the area of the network. The quadtree data structure can then be used as described in U.S. Pat. No. 6,212,392, noted above, to make efficient location comparisons. Moreover, by processing home zone definitions and cell definitions in terms of geographical coordinates, or quadtree elements, rather than in terms of cell ID information, the need for database revision is reduced in relation to changing network topology.

The cell ID information can then be compared (310) to the location of interest. In the case of location-based billing applications, this comparison is generally made to determine if the mobile unit is inside or outside of the location of interest. In other applications, such as boundary crossing applications, the cell unit location may be compared to a boundary line or another locus of points to determine information regarding proximity to the location of interest. If no match is found between the mobile unit location and the stored location of interest, an "out of home zone" message is reported (314) to the service application. In response to this message, an appropriate rate for the call may be applied and/or a corresponding display element may be provided on the subscriber's handset.

In the case of the illustrated location-based billing application, if the comparison of the cell ID of the mobile unit matches (312) the location of interest, then a more accurate location source may be invoked. This may be understood by reference to FIG. 2. If a call is placed by the mobile unit at a point on path 206 within cell D (or cell C or cell E), the cell ID information alone is insufficient to determine whether the call is placed inside or outside of home zone 204. An application may simply give the subscriber the "benefit of the doubt" and consider any call placed anywhere within cells C, D and E as being placed within the home zone. However, such an implementation would effectively enlarge the home zone and reduce the service provider's revenues. Moreover, due to irregularities in network coverage, such an implementation may result in different subscribers having substantially different size home zones or an individual subscriber having their effective home zone changed in size due to changes in network topology.

The present invention efficiently allows for a better home zone determination. Thus, when a match is indicated between the cell ID information and the location of interest, the illustrated method proceeds to invoke (316) a second source such as a multilateration source, for example, to obtain more accurate location information. The resulting information is compared to the home zone definition to determine whether there is a match (318). Thus, for example, it may be determined that at the time of a call the mobile unit is within cell D but outside of home zone 204. Alternatively, the information from the second source may indicate that the call is being placed from within the home zone. If it is determined that the call is from outside of the home zone, then an "out of home zone" message is reported (314) to the location-based billing application. For example, a predefined field of a call detail record may be populated with one or more bits of information indicating a rating value. The location-based billing application uses this information for rating the call and may also provide an indication of zone status to the subscriber via a display of the mobile unit. Additionally, the mobile unit location may be utilized to determine a timing for a subsequent source invocation. For example, if the mobile unit is far from the subscriber's home zone, it may be determined that no further location update is required for a period of time determined based on distance and assumed or known travel speeds. On the other hand, if the call is placed from inside of the home zone, an "in home zone" message is reported (320) to the location of a billing application and this information may be used for rating purposes and may be reported to the mobile unit. In either case, the location of a billing application applies (322) the appropriate billing parameter for the call. Depending on the application, the method 300 may further involve continuing to monitor (324) the location of the mobile unit, for example, to provide an ongoing indication of the zone status.

FIG. 4 is a message flow diagram corresponding to a series of phone calls placed by the subscriber along travel path 206 of FIG. 2. The columns of the diagram correspond to the network nodes associated with the service application, the gateway, the associated processor, and the at least two location sources. The rows of the array are ordered in time sequence corresponding to the message flow. Thus, at a first time corresponding to a first point along path 206, the application transmits a request (400) to the gateway for location information, for example in response to a call initiation by the subscriber. The gateway then accesses (402) source 1 which is a cell ID source. The source returns information (404) indicating that the subscriber is located in cell A. This information is transmitted (406) to the processor which compares the cell ID location to the home zone definition. As discussed above, this comparison may be performed in terms of geographical coordinates or quadtree data elements rather than in terms of cell ID information. In this case, the processor indicates (408) that the cell ID location does not match the home zone definition. For example the logic for making this determination may recognize that no point within cell A is also within the home zone, i.e., there is no overlap. This is then reported (410) by the gateway to the application. The application may use this information to assign a rate for the call and/or to report zone status to the subscriber.

Subsequently, the application may transmit another location request (412) to the gateway. It should be appreciated that, although the example of FIG. 4 relates to a succession of one time only location requests, a similar series of location comparisons may be implemented in connection with a location request that requests periodic or other repeating location updates. In such a case, the illustrated message sequence would change slightly related to messages between the application and gateway. In any case, in response to the second location request of FIG. 4, the gateway again accesses (414) to obtain cell ID information (416) indicating that the call is being placed from cell B. This information is reported (418) to the processor which again performs a comparison and determines that there is no match between the cell ID location and the home zone. This information is once again reported (420) to the gateway and, in turn (421) to the application.

Thereafter, a third location request (422) is transmitted from the application to the gateway. Once again, in response to this location request, source 1 is accessed (424) to obtain cell ID information. Source 1 responds (426) by indicating that the mobile unit is located within cell B. This information is reported (428) to the processor to perform a comparison of the cell ID information to the home zone definition. In this case, the comparison indicates (430) a match, that is, an overlap between the definition of cell D and the home zone definition. It will be appreciated that this comparison is not necessarily determinative as to the true position of the mobile unit relative to the home zone. Accordingly, the gateway invokes (432) source 2 to provide location information. The nature and accuracy of the location information reported back (432) from the second source depends on the nature of the source. In the case of a multilateration technology, such information may include geographical coordinates coupled with an uncertainty. It will be appreciated that this location information defines an area, albeit an area smaller than a cell coverage area. This coordinate information is passed (436) to the processor which again performs a comparison to determine any overlap between this more accurate location information and the cell definition. This comparison may be performed in terms of an overlap determination as between the quadtree elements corresponding to the uncertainty region of the location information and the quadtree elements corresponding to the home zone definition. In this case, the processor determines (438) that there is no match. That is, although the mobile unit is located within cell B, it is outside of the home zone 204. This is reported (440) to the application.

Finally, the application transmits a fourth location request (442) to the gateway. In response to this request, the gateway requests (444) cell ID information from source 1. Source 1 responds (446) with information indicating that the mobile unit is located in cell D. This information is reported (448) to the processor which reports (450) a match in that cell D overlaps with the home zone. In response to this initial match, the gateway invokes (452) source 2 to provide more accurate location information. Source 2 responds (454) with location information, e.g., in terms of geographical coordinates and an uncertainty radius defining an uncertainty region. This is reported (456) to the processor which performs a further comparison and, in this case, determines (458) that there is a match. That is, the location or uncertainty area associated with the more accurate location information overlaps with the home zone 204. This match is then reported (460) to the service application. In this manner, the benefits of using a more accurate source of location information can be achieved without unnecessarily invoking such a source when lower resource or a faster response time information yields sufficient information for the purposes of the application under consideration.

In the example of FIG. 4, the various determinations as to whether the mobile unit was located inside or outside of its home zone were performed by a processor separate from the application platform, e.g., associated with the gateway. In some cases, it may be desired to execute such logic in connection with the application. For example, in the context of a location-based billing application, a single subscriber may have multiple defined zones, e.g., a home zone, a work zone, a school zone, etc. It may be more convenient for the application to make comparisons relative to these multiple zones. Additionally, as will be understood from the following description, executing such logic in conjunction with the application platform may reduce the number of messages transmitted across the gateway interface thereby further conserving valuable resources.

Figure 5:
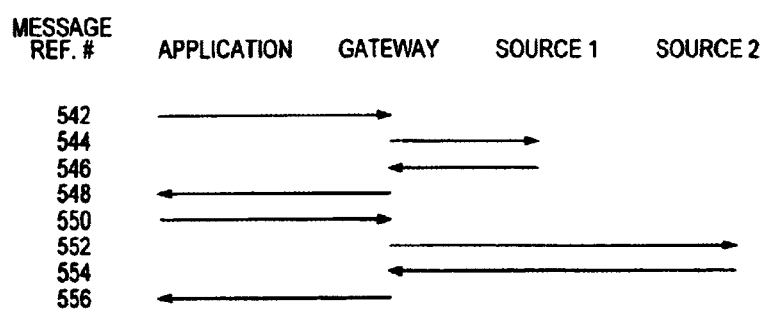
FIG. 5 is a illustrative message sequence wherein the zone comparison logic is executed at the application platform.

FIG. 5 illustrates a message sequence where the zone comparison logic is executed at the application platform. In particular, FIG. 5 illustrates a message set where first and second sources are sequentially accessed analogous to messages 442–460 of FIG. 4. It will be appreciated that, in the context of the present invention, it may only be necessary to access one of the sources in order to obtain adequate information for a zone comparison as discussed above.

The illustrated message sequence is initiated when the application transmits a message (542) to the gateway seeking location information for an identified mobile unit. This location request may explicitly request location information from a particular source, such as a low resource source like cell ID, or may otherwise specify a low quality of service parameter. In response to this request, the gateway invokes (544) source 1 and obtains location information (546), in this case, cell ID information. This information is reported (548) to the application which compares the location information to one or more defined zones of the subscriber. As discussed above, it may be possible to establish conclusively based on the cell ID information that the subscriber is within or outside of one or more zones of interest. In the illustrated example, it is assumed that the cell ID information is inconclusive. Accordingly, a further location request (550) is transmitted from the application to the gateway. Again, this location request may explicitly identify source 2 or may otherwise specify a more stringent quality and service with regards to the accuracy of the requested location information. In response to this request, the gateway invokes (552) source 2. Source 2 responds with location information (554) such as location coordinate information based on a TDOA or other location technology. This information is then reported (556) to the application such that an in zone or out of the zone determination can be made. It will be appreciated that architectures other than those shown in FIGS. 4 and 5 may be implemented for making location comparisons in connection with other network elements.

While various embodiments of the present invention have been described in detail, it is apparent that further modifications and adaptations of the invention will occur to those skilled in the art. However, it is to be expressly understood that such modifications and adaptations are within the spirit and scope of the present invention.

The invention claimed is:

1. A method for use in providing location information regarding mobile units in a telecommunications network, comprising the steps of:
    first obtaining identification information regarding a mobile unit to be located and parameter information comprising a spatial accuracy of the location information;
    second obtaining first location information regarding said mobile unit from a first source, said first source being associated with a first expected lag time relating to providing the first location information and a first expected resource requirement related to system resources involved in providing the first location information;
    performing a comparison of the first location information to the parameter information;
    based on said comparison, selectively obtaining second location information regarding said mobile unit from a second source different than said first source, said second source being associated with a second expected lag time relating to providing the second location information and a second expected resource requirement related to system resources involved in providing the second location information;
    where at least one of the first expected lag time and first expected resource requirement is greater than at least one of the second expected lag time and second expected resource requirement; and
    providing an output related to said location request based on at least one of said first location information or said second location information.

2. A method as set forth in claim 1, wherein said step of first obtaining comprises receiving a location request from a location-based services application.

3. A method as set forth in claim 1, wherein said step of first obtaining comprises receiving a prompt from an application user and accessing information regarding one or more locations of interest.

4. A method as set forth in claim 3, wherein said one or more locations of interest comprise one or more zones of a location-based services application.

5. A method as set forth in claim 1, wherein said step of second obtaining comprises accessing Cell ID information available within said network.

6. A method as set forth in claim 1, wherein said step of performing a comparison comprises using said parameter information to define a condition to be evaluated with respect to the desired location information and making a determination as to whether said first location information is sufficient to evaluate said condition.

7. A method as set forth in claim 6, wherein said condition relates to determining a location of said mobile unit relative to a defined geographic zone and said determination involves evaluating whether said first information is substantially conclusive in establishing the location of said mobile unit relative to said defined zone.

8. A method as set forth in claim 1, wherein said step of selectively obtaining comprises obtaining said second location information when said first location information yields an ambiguity with regard to the desired location information.

9. A method as set forth in claim 1, wherein said step of selectively obtaining comprises invoking said second source to provide said second location information, where said second location information has a location accuracy greater than said first information.

10. A method as set forth in claim 1, wherein said step of selectively obtaining comprises receiving information from network based location determination equipment.

11. A method as set forth in claim 1, wherein said step of selectively obtaining comprises transmitting a location request designating one or said second source and a quality of service parameter associated with said second source.

12. A method as set forth in claim 1, wherein said step of providing an output comprises outputting a rating value for use in billing a call associated with said mobile unit.

13. A method as set forth in claim 1, wherein said first source is a Cell ID source and said second source is one of a network based location determination equipment source and a GPS source.

14. A method as set forth in claim 1, further comprising the step of repeatedly invoking said first source prior to said step of selectively obtaining second location information.

15. A method for use in providing location information regarding mobile units in a telecommunications network, comprising the steps of:
    obtaining identification information regarding a mobile unit to be located and parameter information regarding the desired location information, wherein the parameter information comprises at least one of a measure of system resources utilized to obtain the location information, a lag time for obtaining the location information, or an accuracy of the location information;
    monitoring information from at least a first source over time to obtain successive instances of first location information regarding said mobile unit;
    performing a comparison to determine whether a location of said mobile unit as indicated by said monitored information satisfies a defined relationship relative to the parameter information;
    based on said comparison, selectively obtaining second location information regarding said mobile unit from at least a second source different than said first source; and
    providing an output related to said location request based on said second location information.

16. A method as set forth in claim 15, wherein said step of performing a comparison comprises using said parameter information to define a condition to be evaluated with respect to the desired location information and making a determination as to whether said first location information is sufficient to evaluate said condition.

17. A method as set forth in claim 15, wherein said step of selectively obtaining comprises obtaining said second location information when said first information is insufficiently accurate to determine whether said location of said mobile unit satisfies said defined relationship.

18. A method as set forth in claim 15, wherein said step of providing an output comprises outputting a rating value for use in billing a call associated with said mobile unit.

19. A method for use in providing location information regarding mobile units in a telecommunications network, comprising the steps of:
    first obtaining identification information regarding a mobile unit to be located and parameter information regarding system resources utilized to obtain the desired location information;

second obtaining first location information identifying an approximate location of said mobile unit based on a network subdivision of said telecommunications network;

performing a comparison of the first location information to the parameter information;

based on said comparison, selectively obtaining second location information, where said second location information has a location accuracy greater than that of said first location information; and providing an output related to said location request based on said second location information.

20. A method as set forth in claim 19, wherein said step of performing a comparison comprises using said parameter information to define a condition to be evaluated with respect to the desired location information and making a determination as to whether said first location information is sufficient to evaluate said condition.

21. A method as set forth in claim 19, wherein said step of selectively obtaining comprises obtaining said second location information when said first location information yields an ambiguity with regard to the desired location information.

22. A method as set forth in claim 19, wherein said step of selectively obtaining comprises receiving information from network based location determination equipment.

23. A method as set forth in claim 19, wherein said step of providing an output comprises outputting a rating value for use in billing a call associated with said mobile unit.

24. A method for use in providing location information for mobile units in a wireless network, comprising the steps of:
receiving first information regarding a location of interest for a first mobile unit;
receiving a first indication of a location of said first mobile unit at a first time; and
based on said first information regarding said location of interest and said first indication regarding said first location of said first mobile unit at said first time, determining a timing for obtaining a second indication of a second location of said first mobile unit.

25. A method as set forth in claim 24, wherein said step of receiving said first information comprises receiving information defining a geographical zone used by a location-based services application.

26. A method as set forth in claim 24, wherein said first step of receiving a first indication comprises obtaining Cell ID information regarding said first mobile unit.

27. A method as set forth in claim 24, wherein said step of determining a timing comprises determining a length of time to wait before obtaining said second information based on a distance between said location of interest and said first location.

28. A method for use in providing location information regarding mobile units in a telecommunications network, comprising the steps of:
providing an interface for use in obtaining location information from a first source and a second source, said first source having a first quality of service characteristic and said second source having a second quality of service characteristic;
utilizing said first source to perform a first location operation to locate a first mobile unit;
determining a required quality of service for said first location operation; and
based on said required quality of service, selectively using said interface to obtain said location information from said second source.

29. A method as set forth in claim 28, wherein said step of determining comprises obtaining initial location information from said first source having said first quality of service and determining that said first quality of service is insufficient for said first location operation.

30. A method as set forth in claim 28, wherein said step of determining comprises identifying said first operation as being one of a primary monitoring operation for obtaining general location information or a secondary locating operation, responsive to said primary monitoring operation, for obtaining specific location information.

31. A method as set forth in claim 1, wherein said parameter information is a proximity to a location of interest.

32. A method as set forth in claim 15, wherein said parameter information is a proximity to a location of interest.

* * * * *